(12) United States Patent
Jeong et al.

(10) Patent No.: US 12,143,024 B2
(45) Date of Patent: Nov. 12, 2024

(54) SENSORLESS PREDICTION METHOD OF OVERCURRENT IN ISOLATED BIDIRECTIONAL DC-DC CONVERTER

(71) Applicant: HYOSUNG Corporation, Anyang-si (KR)

(72) Inventors: Byung Hwan Jeong, Gwacheon-si (KR); Byeng Joo Byen, Suwon-si (KR); Joo Yeon Lee, Seoul (KR)

(73) Assignee: HYOSUNG Corporation, Anyang-si (KR)

( * ) Notice: Subject to any disclaimer, the term of this patent is extended or adjusted under 35 U.S.C. 154(b) by 254 days.

(21) Appl. No.: 17/623,408

(22) PCT Filed: Dec. 30, 2020

(86) PCT No.: PCT/KR2020/019407
§ 371 (c)(1),
(2) Date: Dec. 28, 2021

(87) PCT Pub. No.: WO2021/141321
PCT Pub. Date: Jul. 15, 2021

(65) Prior Publication Data
US 2022/0360160 A1 Nov. 10, 2022

(30) Foreign Application Priority Data
Jan. 9, 2020 (KR) .................. 10-2020-0003398

(51) Int. Cl.
*H02M 3/335* (2006.01)
*H02M 1/32* (2007.01)
(52) U.S. Cl.
CPC ......... *H02M 3/33573* (2021.05); *H02M 1/32* (2013.01); *H02M 3/33584* (2013.01)

(58) Field of Classification Search
CPC .. H02M 1/0012; H02M 1/32; H02M 3/33515; H02M 3/33569–33592
See application file for complete search history.

(56) References Cited

U.S. PATENT DOCUMENTS 9,987,937 B1 * 6/2018 Mohamed ............... H02J 50/12
2019/0372471 A1 * 12/2019 Peng ................. H02M 3/33584
(Continued)

FOREIGN PATENT DOCUMENTS

| JP | 2011-205727 A | 10/2011 |
| JP | 2019-103385 A | 6/2019 |

(Continued)

*Primary Examiner* — Fred E Finch, III
(74) *Attorney, Agent, or Firm* — NKL Law; Jae Youn Kim

(57) ABSTRACT

Proposed is a method for accurately predicting an overcurrent flowing inside an isolated bidirectional DC-DC converter even without using a current sensor on primary and secondary sides of a transformer. In the converter according to the present disclosure, an average value of the inductor current is calculated after deriving inflection point current values by respectively modeling a current waveform for an inductor current of the transformer. A secondary side output current average value is calculated by comparing the calculated average value of the inductor current with a secondary side capacitor current average value of the converter at no load. Next, an error between the secondary side output current average value and an actually measured secondary side output current is calculated, and the inflection point current values of the current waveform are updated using a gain for reducing the error through PI control, whereby the overcurrent may be predicted.

9 Claims, 12 Drawing Sheets

(56) References Cited

U.S. PATENT DOCUMENTS

| | | | | |
|---|---|---|---|---|
| 2021/0155100 A1* | 5/2021 | Khaligh | ................. | B60L 55/00 |
| 2022/0077759 A1* | 3/2022 | Jeong | ................ | H02M 3/33584 |
| 2022/0158563 A1* | 5/2022 | Ishibashi | ................ | H02M 1/38 |

FOREIGN PATENT DOCUMENTS

| | | |
|---|---|---|
| KR | 10-2014-0018489 A | 2/2014 |
| KR | 10-1461900 B1 | 11/2014 |
| KR | 10-1575493 B1 | 12/2015 |
| KR | 10-2177142 B1 | 11/2020 |

\* cited by examiner

SENSORLESS PREDICTION METHOD OF OVERCURRENT IN ISOLATED BIDIRECTIONAL DC-DC CONVERTER

TECHNICAL FIELD

The present disclosure relates to a sensorless prediction method of an overcurrent in an isolated bidirectional DC-DC converter and, more particularly, to a method of accurately predicting an overcurrent flowing inside an isolated bidirectional DC-DC converter without using a current sensor.

BACKGROUND ART

The spread of bidirectional DC-DC converters is expanding to connect a DC grid system and energy storage systems (ESSs) to each other. In general, the bidirectional DC-DC converters are divided into isolated and non-isolated types depending on types of insulation, and the isolated bidirectional DC-DC converters are mainly used for system stability.

FIG. 1 is a circuit diagram of a conventional isolated bidirectional DC-DC converter. The isolated bidirectional DC-DC converter 10 may transmit primary side electrical energy to a secondary side through a high-frequency isolated transformer 13 and conversely transmit secondary side electrical energy to a primary side, so bidirectional power transmission is possible.

The primary side input voltage Vdc1 is charged in the first capacitor 11 and is output to the transformer 13 by switching of switches 12a to 12d of a first switching unit 12. The transformer 13 transmits the voltage induced in the primary side to the secondary side according to a turns ratio. A secondary side voltage of the transformer 12 is converted according to switching operations of switches 14a to 14d of the second switching unit 14, charged in the second capacitor 15, and output as an output voltage Vdc2.

In general, an input current i1 and an output current i2 are respectively detected by current sensors 21 and 22 and transmitted to a higher hierarchy controller, and an input voltage Vdc1 and an output voltage Vdc2 are respectively transmitted to the higher hierarchy controller by the voltage sensors 23 and 24.

The switches 12a to 12d and 14a to 14d of the isolated bidirectional DC-DC converter 10 are implemented with semiconductor switches so are damaged when an overcurrent flows in the converter 10. Therefore, overcurrent detection inside the converter 10 is very important.

Accordingly, in order to detect an overcurrent in a conventional isolated bidirectional DC-DC converter 10, current detection sensors 25 and 26 are respectively installed on the primary and secondary sides of the transformer 13 and detect an inductor current iL flowing through an inductor 16 of the transformer 13.

However, even though the current detection sensors 25 and 26 are installed, it is difficult to accurately detect the inductor current iL. This is because, in the case of the conventional isolated bidirectional DC-DC converter 10, it is almost impossible to sense the inductor current within a certain sensing period because the peak value of the inductor current iL varies from time to time.

In other words, as the power processed by the converter 10 increases, the peak value of the inductor current iL of the transformer 13 fluctuates as shown in the waveform of the inductor current iL in FIG. 2. Accordingly, there is a problem in that it is difficult to accurately detect the current peak value in the sampling period.

For example, as the power increases, the current peak value fluctuates depending on switching frequency, PWM switching, input/output voltage fluctuation, charging/discharging status, and the like. Therefore, there is a problem in that it is not known when the peak value will occur, and even when the current is sensed according to a control period of a CPU, the peak value that changes frequently may not be sensed.

Accordingly, there is a problem in that it is difficult to detect the overcurrent in the related art, so the switches 12a to 12d and 14a to 14d implemented with semiconductor switches are damaged due to the overcurrent.

Accordingly, there is a need for the development of technology capable of accurately predicting the overcurrent in the related technical field in order to prevent an accident caused by the overcurrent in the isolated bidirectional DC-DC converter.

DISCLOSURE

Technical Problem

Accordingly, the present disclosure has been made keeping in mind the above problems occurring in the related art, and an objective of the present disclosure is to provide a sensorless prediction method of an overcurrent, the method accurately predicting the overcurrent flowing inside an isolated bidirectional DC-DC converter even without using a sensor in the isolated bidirectional DC-DC converter.

Another objective of the present disclosure is to provide a method for accurately predicting an occurrence of the overcurrent in a corresponding converter by modeling a current excited in an inductor of a high-frequency transformer in a sensorless isolated bidirectional DC-DC converter.

Technical Solution

In order to accomplish the above objectives, there may be provided a sensorless prediction method of an overcurrent in an isolated bidirectional DC-DC converter according to an embodiment of the present disclosure, the converter including a first capacitor configured to charge an input voltage, a first switching unit composed of a plurality of switches and converting and outputting the input voltage charged in the first capacitor through a switching operation, a transformer having a primary side connected to output terminals of the first switching unit, a second switching unit connected to a secondary side of the transformer and composed of a plurality of switches, and a second capacitor configured to store an output voltage of the second switching unit, the method including: respectively modeling a current waveform for an inductor current of the transformer according to a step-down condition and a step-up condition of the converter using a plurality of input values; deriving a current value at each of inflection points of the modeled current waveform; calculating an average value $I_{L\_ave}$ of the inductor current according to the step-down condition and the step-up condition by using the calculated inflection point current values; calculating a secondary side output current average value I2 by comparing the second capacitor current average value $I_{c\_ave}$ when the converter is at no load with the average value $I_{L\_ave}$ of the inductor current; calculating an error between the secondary side output current average value I2 and the secondary side output current i2; updating the current value at each of the inflection points of the modeled current waveform by outputting a gain k for reducing the error through PI control and using the gain k; and predicting an overcurrent of the inductor current using the updated current value.

In this case, the modeled inductor current may increase or decrease linearly, have the average of zero within one period, and be formed such that an element for a first half period π and an element for a second half period π are identical except having opposite signs.

In addition, the plurality of input values may include a peak value Vpri of a primary side voltage of the transformer, each frequency ωsw of switching frequencies of the first and second switching units, an internal equivalent inductance L of the converter, a zero period length α of the primary side voltage of the transformer, a zero period length β of a secondary side voltage of the transformer, a phase difference φ between the primary and secondary side voltages of the transformer, and a voltage ratio g between the primary and secondary side voltages of the transformer.

Here, the φ may be a phase difference between the primary and secondary side voltages of the transformer when a duty ratio according to on/off switching of the first and second switching units is 0.5, and the updating the current value at each of the inflection points of the modeled current waveform may recalculate the inflection point current values of the modeled current waveform using φ updated by summing the output gain k and the input variable φ.

In addition, when the updated inflection point current value is greater than a preset reference value, the predicting an overcurrent may predict the overcurrent has occurred.

In addition, in the step-down condition, the current waveform is characterized that, in the case of φ≥0, the Vpri has a phase faster than the Vsec by the φ, and the Vsec is smaller than the Vpri, and in the case of φ<0, the Vpri has the phase delayed more than the Vsec by the φ, and the Vsec is smaller than the Vpri.

In addition, in the step-up condition, in the case of φ≥β>0, the Vpri may have a phase faster than the Vsec by the φ, and the Vsec may be greater than the Vpri, and in the case of φ<β, the Vpri may have the phase faster than the Vsec by the φ, and the Vsec may be greater than Vpri.

Advantageous Effects

As described above, according to the present disclosure, it is possible to accurately predict an overcurrent in an isolated bidirectional DC-DC converter even without installing a sensor in the isolated bidirectional DC-DC converter.

In addition, according to the present disclosure, the overcurrent is predicted in the isolated bidirectional DC-DC converter even without the installation of the sensor, so installation costs of the sensor are reduced compared to the related art.

In addition, according to the present disclosure, it is possible to accurately predict a peak value of an inductor current flowing into a transformer of the isolated bidirectional DC-DC converter to determine whether the overcurrent has occurred.

In addition, according to the present disclosure, it is possible to accurately predict the overcurrent of the isolated bidirectional DC-DC converter, so it is possible to immediately perform responses to a failure, so that a fault diagnosis of the converter is possible and damage of power semiconductors can be prevented, thereby stably operating the converter.

MODE FOR INVENTION

Figure 1:
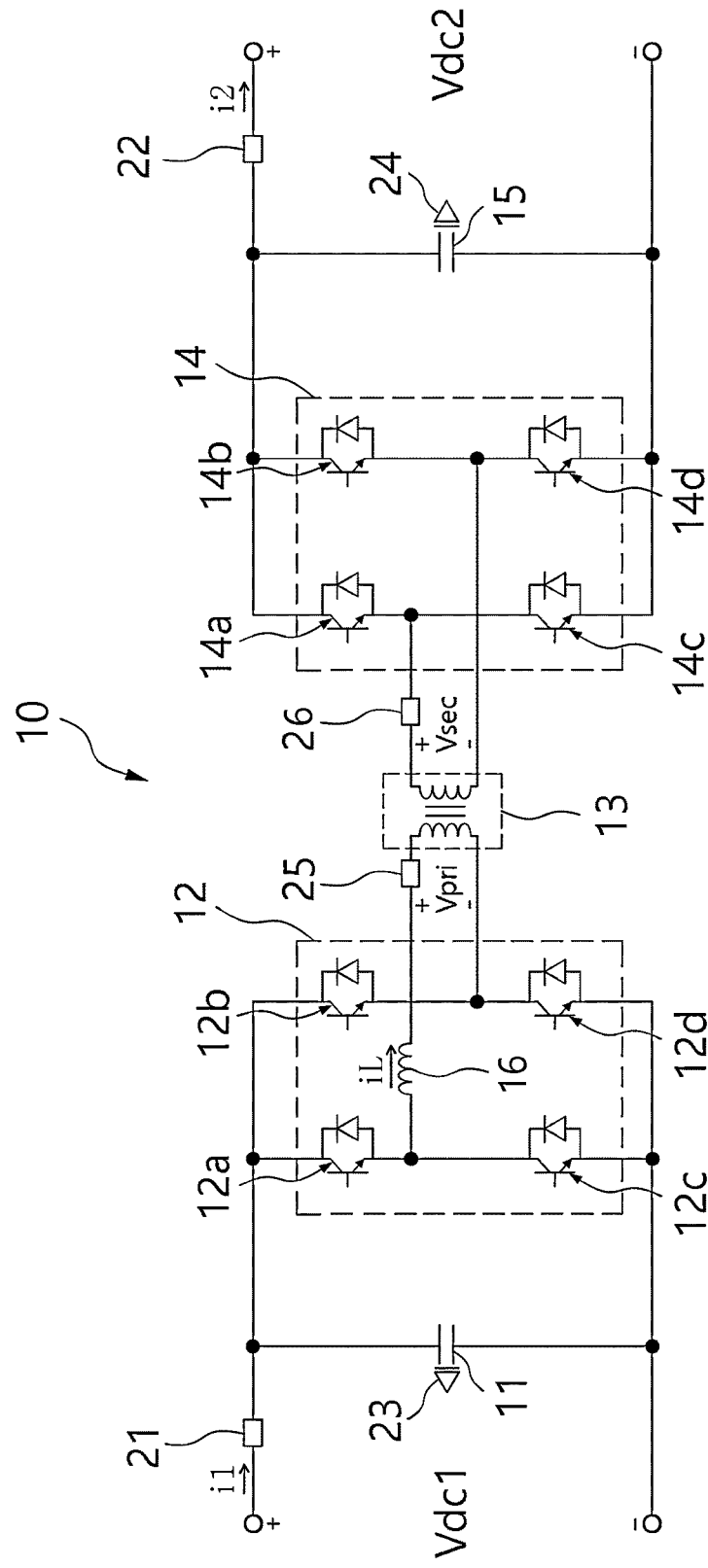
FIG. 1 is a circuit diagram of a conventional isolated bidirectional DC-DC converter.
Figure 2:
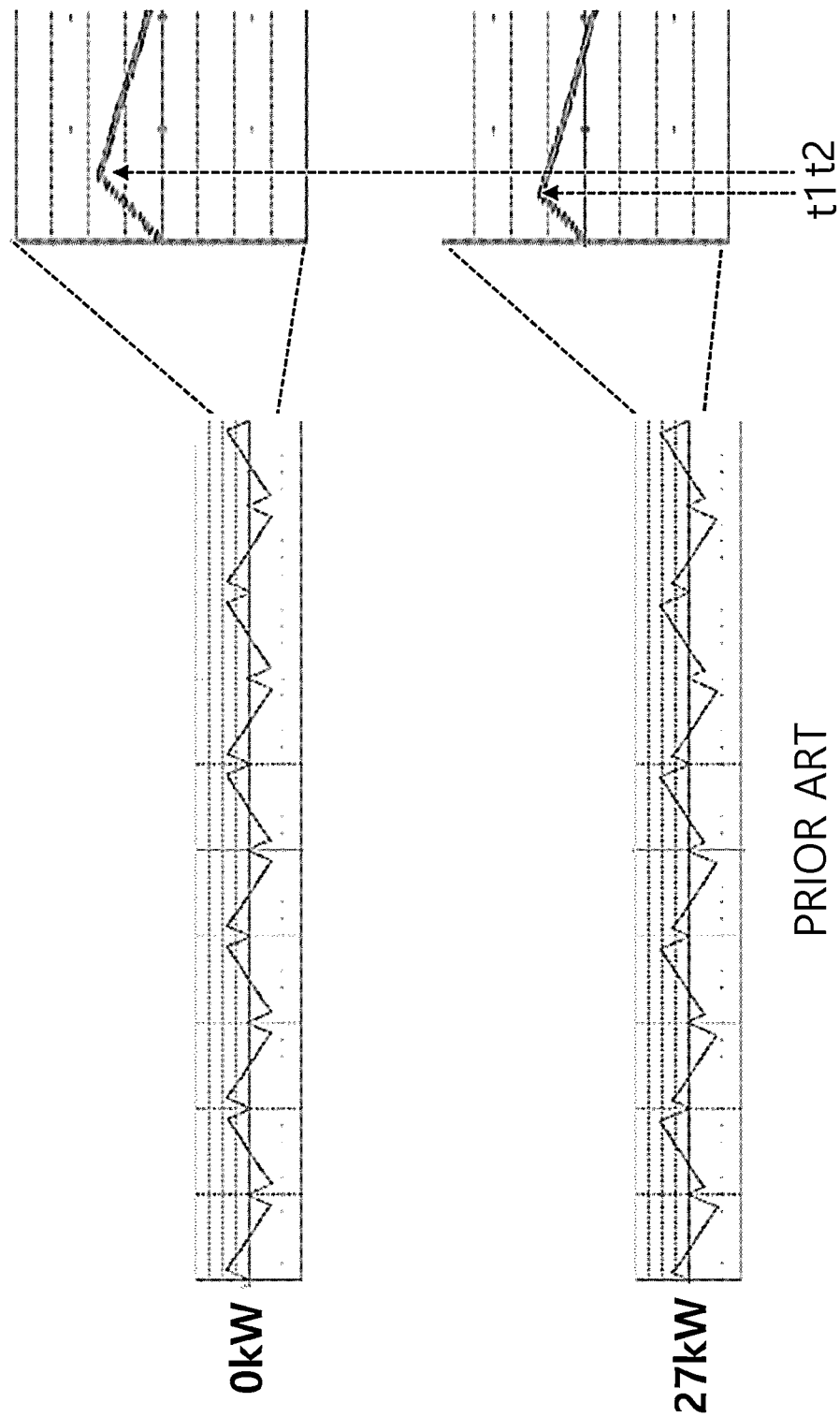
FIG. 2 shows current waveform diagrams of a conventional isolated bidirectional DC-DC converter.

Hereinafter, some embodiments of the present disclosure will be described in detail with reference to exemplary drawings. In adding reference numerals to components of each of the drawings, it should be noted that the same components are given the same reference numerals as much as possible even though the same components are indicated on different drawings. In addition, in describing the embodiment of the present disclosure, when it is determined that a detailed description of a related known configuration or function interferes with the understanding of the embodiment of the present disclosure, the detailed description thereof will be omitted.

In addition, in describing the components of the embodiment of the present disclosure, terms such as first, second, A, B, (a), (b), and the like may be used. Such terms are only for distinguishing the elements from other elements, and the essence, turn, or order of the elements are not limited by the terms. When a component is described as being "connected", "coupled", or "hooked up" to another component, the component may be directly connected, coupled, or accessed to the other component, but it will be understood that another component may also be "connected", "coupled", or "hooked up" in between each component.

Figure 3:
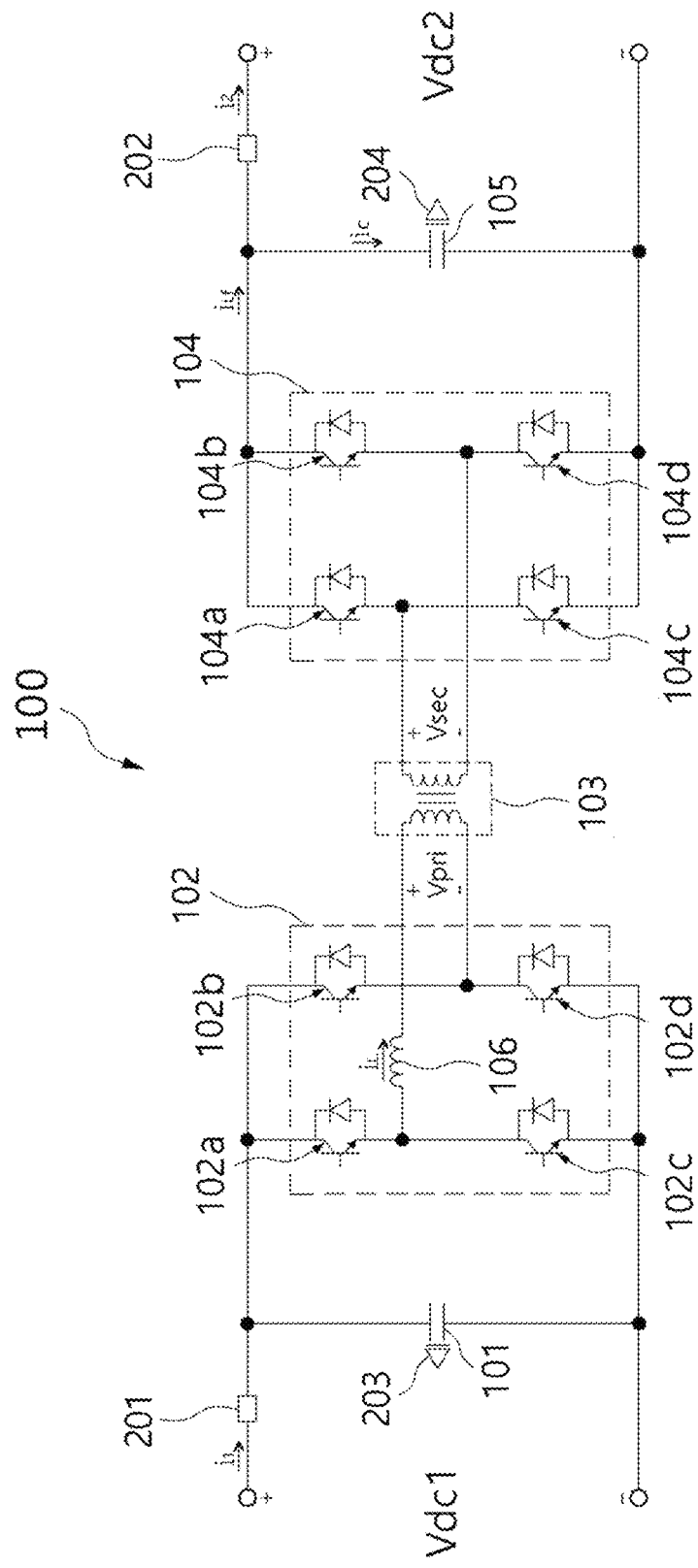
FIG. 3 is a circuit diagram of an isolated bidirectional DC-DC converter according to an embodiment of the present disclosure.

FIG. 3 is a circuit diagram of an isolated bidirectional DC-DC converter according to an embodiment of the present disclosure.

With reference to FIG. 3, the isolated bidirectional DC-DC converter 100 according to the present disclosure includes: a first capacitor 101 configured to charge a primary side input voltage Vdc1; a first switching unit 102 composed of a plurality of switches 102a to 102d and converting and outputting the input voltage Vdc1 charged in the first capacitor 101 by a switching operation; a transformer 103 to which output terminals of the first switching unit 102 are connected to a primary side there; a second switching unit 104 connected to a secondary side of the transformer 103 and including a plurality of switches 104a to 104d; and a second capacitor 105 configured to store an output voltage Vdc2 of the second switching unit 104.

The transformer 103 used in the isolated bidirectional DC-DC converter 100 of the present disclosure is a high-frequency transformer and converts a high-frequency voltage to a high or low voltage through high-frequency switching of the switches 102a to 102d and 104a to 104d of the first and second switching units 102 and 104, respectively. In addition, the plurality of switches 102a to 102d and 104a to 104d may be implemented with, for example, a MOSFET, an IGBT, or the like.

Such isolated bidirectional DC-DC converter 100 may be connected between a DC grid system and an energy storage system (ESS) such as a battery and is capable of transmitting power in opposite directions.

Compared with the conventional isolated bidirectional DC-DC converter 10, the isolated bidirectional DC-DC converter 100 of the present disclosure does not require current sensors (reference numerals 25 and 26 in FIG. 1) configured to detect an inductor current iL flowing in the inductor 106 of the transformer 103.

In the present disclosure, the inductor current may be accurately estimated by modeling the inductor current iL through a predetermined program even without directly detecting the inductor current iL using the current sensors 25 and 26 as in the related art.

To this end, in a sensorless prediction method of an overcurrent in an isolated bidirectional DC-DC converter according to the present disclosure, the inductor current iL is modeled using input/output currents i1 and i2 and the input/output voltages Vdc1 and Vdc2 even without having current sensors provided on the primary and secondary sides of the transformer 103 unlike the related art, whereby the actual inductor current iL may be calculated and thus predicted, wherein the input/output currents i1 and i2 and the input/output voltages Vdc1 and Vdc2 are detected by current sensors 201 and 202 and voltage sensors 203 and 204 respectively installed at input and output terminals of the converter 100.

Figure 4:
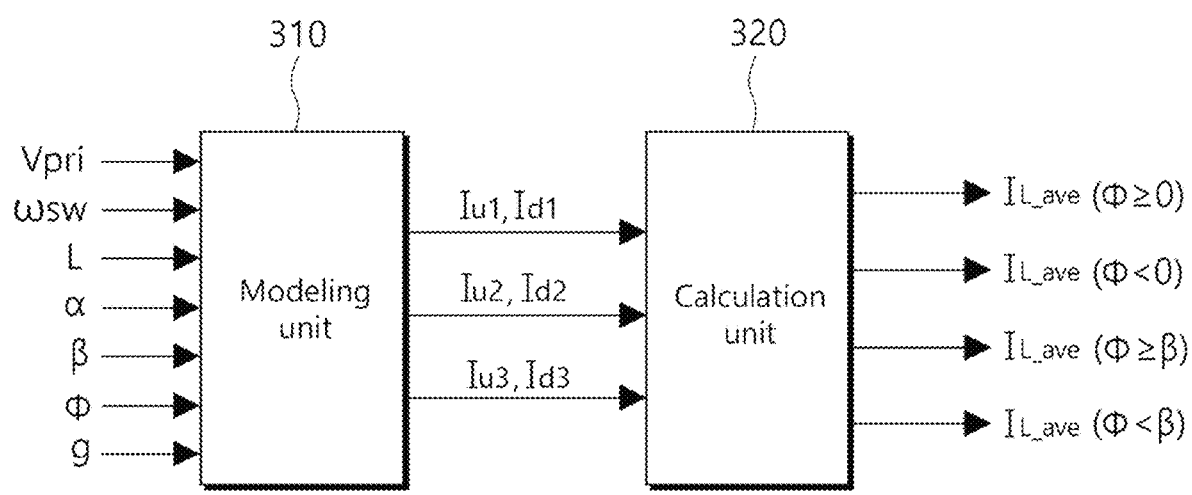
FIG. 4 is a configuration diagram of an inductor current prediction device of the isolated bidirectional DC-DC converter according to the embodiment of the present disclosure.

FIG. 4 is a configuration diagram of an inductor current prediction device of the isolated bidirectional DC-DC converter according to the embodiment of the present disclosure.

With reference to FIG. 4, the inductor current prediction device of the isolated bidirectional DC-DC converter according to the present disclosure includes a modeling unit 310 and a calculation unit 320.

The modeling unit 310 receives a plurality of input values to model a current waveform of the inductor current iL, and the calculation unit 320 calculates an average value of the inductor current iL from the modeled result.

Input values of the modeling unit 310 are a peak value Vpri of a primary side voltage of the transformer 103, each frequency $\omega_{sw}$ of switching frequencies of the switches 102a to 102d and 104a to 104d, an internal equivalent inductance L of the converter 100, a zero period length α of the primary side voltage of the transformer 103, a zero period length β of a secondary side voltage of the transformer 103, a phase difference φ between the primary and secondary side voltages of the transformer 103, and a voltage ratio (g) between the primary and secondary side voltages of the transformer 103.

The phase difference φ may be a phase difference between the primary and secondary side voltages of the transformer 103 when a duty ratio according to on/off switching of the switches 102a to 102d and 104a to 104d is 0.5.

The modeling unit 310 models the current waveform for the inductor current iL using the plurality of input values and derives a current value at each of inflection points of the modeled current waveform.

Specifically, inflection point current values Id1, Id2, and Id3 of the current waveform of the inductor current iL in a step-down condition of the converter 100 and inflection point current values Iu1, Iu2, and Iu3 of the current waveform of the inductor current iL in a step-up condition of the converter 100 are derived.

The calculation unit 320 calculates the average value of the inductor current iL for the step-down condition and the step-up condition by using the inflection point current values.

Hereinafter, a process of calculating the average value of the inductor current iL according to the operation of the modeling unit 310 and the calculation unit 320 according to the present disclosure will be described in detail.

In order to predict the inductor current iL flowing in the inductor 106 of the isolated bidirectional DC-DC converter 100 configured as described above, three assumptions are made for the inductor current iL as in the following for modeling the inductor current iL in the present embodiment.

1) The inductor current increases or decreases linearly by the input/output voltages.
2) The average value of the inductor current within one period 2π is zero.
3) The inductor current is formed such that an element for a first half period π and an element for a second half period π are identical except having opposite signs.

In the present embodiment, it is important to select a current waveform of the inductor current iL in modeling the inductor current iL, and according to a type of a voltage to be applied, a shape of the current flowing through the inductor 106 is predicted, thereby deriving a current waveform of the corresponding inductor current iL by the equation.

When the higher hierarchy controller (not shown) controls the switches 102a to 102d and 104a to 104d in the first and second switching units 102 and 104, respectively, through, for example, single pulse width modulation (SPWM) switching control, the inductor current iL becomes to be a total of four current waveforms as shown in FIGS. 5A-5D.

FIGS. 5A to 5D are waveform graphs of an inductor current according to a step-down condition and a step-up condition in the isolated bidirectional DC-DC converter according to the embodiment of the present disclosure.

With reference to FIG. 5A-5D, the current waveforms of the inductor current in the isolated bidirectional DC-DC converter 100 according to the present disclosure appear differently from each other depending on the step-down condition and the step-up condition from the primary side voltage to the secondary side voltage of the transformer 103.

The step-down condition may be divided into cases when φ≥0 and when φ<0, and the step-up condition may be divided into cases when φ≥β and when φ<β. As described above, φ is the phase difference between the primary and secondary side voltages of the transformer 103, and β is the zero period length of the secondary side voltage of the transformer 103.

Figure 5A:
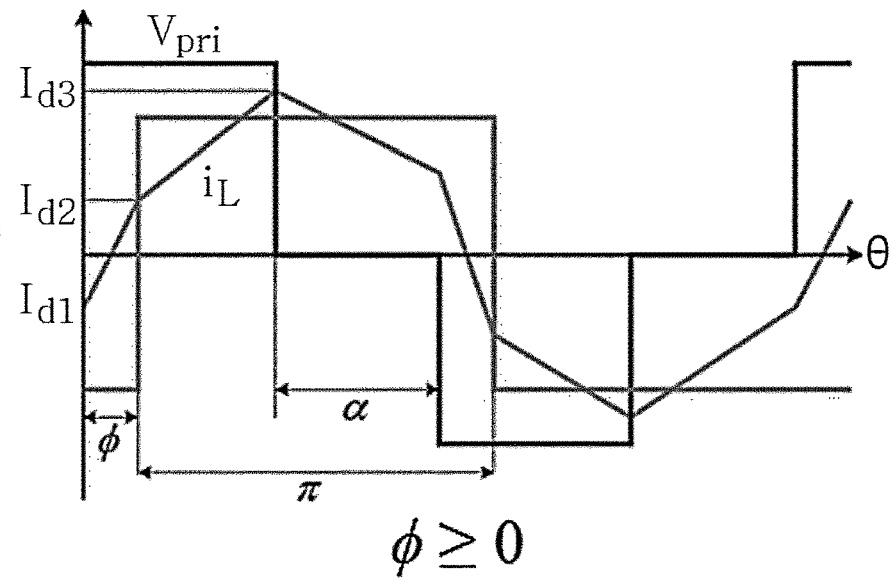
FIGS. 5A to 5D are waveform graphs of an inductor current according to a step-down condition and a step-up condition in the isolated bidirectional DC-DC converter according to the embodiment of the present disclosure.

In the case of φ≥0 in the step-down condition, as in FIG. 5A, Vpri has the phase faster than Vsec by φ, and Vsec is output smaller than Vpri. In the case of φ<0 in the step-down condition, as in FIG. 5B, Vpri has the phase delayed more than Vsec by φ, and Vsec is output smaller than Vpri. In addition, β=0 in the step-down condition.

Figure 5B:
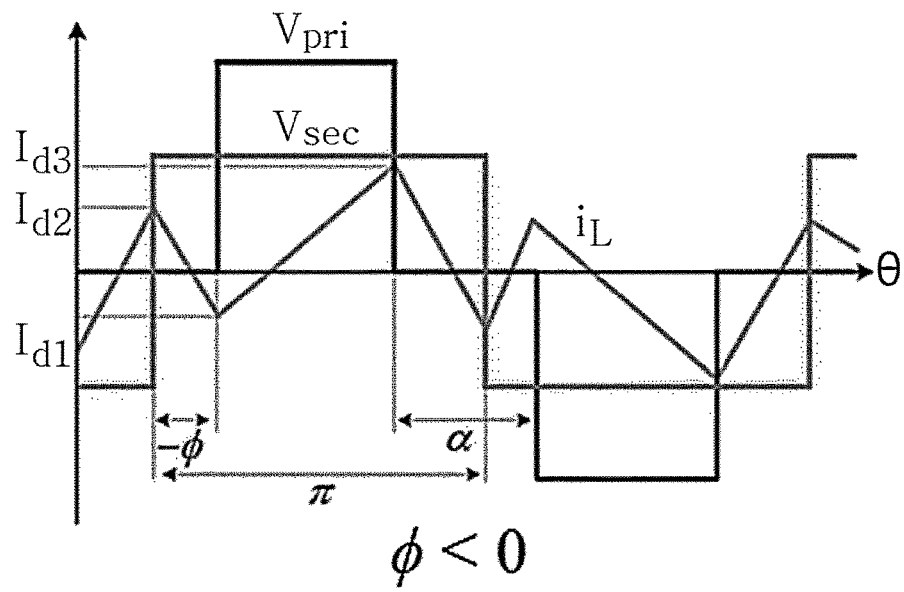
Figure 5C:
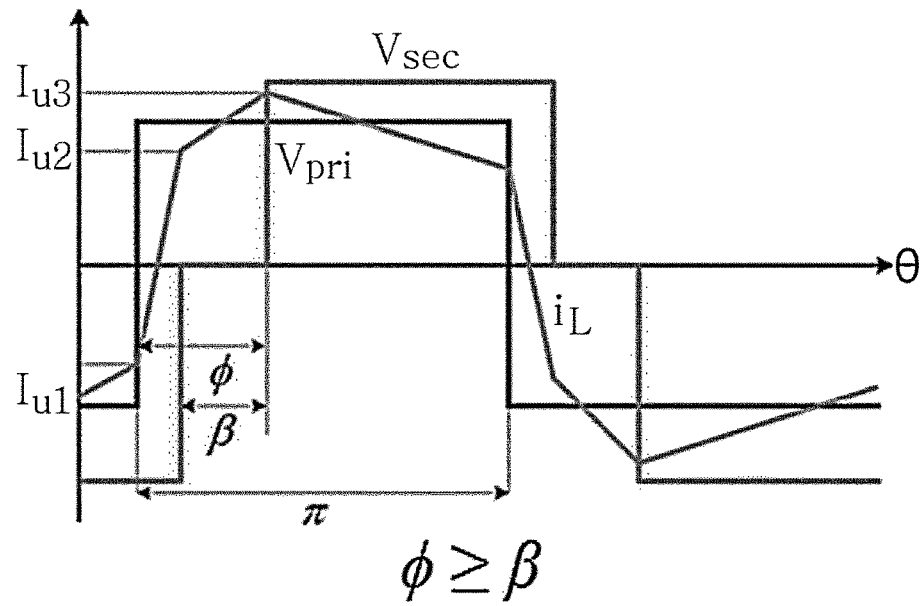

In the step-up condition, β>0 and φ≥β, and as in FIG. 5C, Vpri has the phase faster than Vsec by φ, and Vsec is greater than Vpri. In the case of φ<β in the step-up condition, as in FIG. 5D, Vpri has the phase faster than Vsec by φ, and Vsec is greater than Vpri. Compared with FIG. 5C, FIG. 5D has φ smaller than β.

When the current waveform increases or decreases linearly in the step-down condition, Id1, Id2, and Id3 represent the inflection point current values of the current waveform during the half period, and in the remaining half period, the current waveform has the same magnitude and slope with an opposite sign.

In addition, when the current waveform increases or decreases linearly also in the step-up condition, Iu1, Iu2, and Iu3 represent the inflection point current values of the current waveform during the half period, and in the remaining half period also, the current waveform has the same magnitude and slope with an opposite sign.

From such four waveforms of the inductor current iL, the following modeling equations for the inductor current iL may be established.

1) In case of φ≥0 in step-down condition $$I_{d1} = \frac{V_{pri}}{\omega_{sw}L}\left(\frac{\alpha-\pi}{2} + g\left(\frac{\pi}{2}-\phi\right)\right)$$

$$I_{d2} = \frac{V_{pri}}{\omega_{sw}L}\left(\frac{\alpha-\pi}{2} + \phi + g\frac{\pi}{2}\right)$$

$$I_{d3} = \frac{V_{pri}}{\omega_{sw}L}\left(\frac{-\alpha+\pi}{2} - g\left(\frac{\pi}{2}-\alpha-\phi\right)\right)$$

2) In case of φ<0 in step-down condition $$I_{d1} = \frac{V_{pri}}{\omega_{sw}L}\left(\frac{\alpha-\pi}{2} + g\left(\frac{\pi}{2}+\phi\right)\right)$$

$$I_{d2} = \frac{V_{pri}}{\omega_{sw}L}\left(\frac{\alpha-\pi}{2} + g\frac{\pi}{2}\right)$$

$$I_{d3} = \frac{V_{pri}}{\omega_{sw}L}\left(\frac{-\alpha+\pi}{2} - g\left(\frac{\pi}{2}-\alpha-\phi\right)\right)$$

3) In case of φ≥β in step-up condition $$I_{u1} = \frac{V_{pri}}{\omega_{sw}L}\left(\frac{-\pi}{2} + g\left(\frac{\pi+\beta}{2}-\phi\right)\right)$$

$$I_{u2} = \frac{V_{pri}}{\omega_{sw}L}\left(\phi - \beta - \frac{\pi}{2} + \left(\frac{\pi-\beta}{2}\right)g\right)$$

$$I_{u3} = \frac{V_{pri}}{\omega_{sw}L}\left(\phi - \frac{\pi}{2} + g\frac{\pi-\beta}{2}\right)$$

4) In case of φ<β in step-up condition $$I_{u1} = \frac{V_{pri}}{\omega_{sw}L}\left(\frac{-\pi}{2} + g\left(\frac{\pi-\beta}{2}\right)\right)$$

$$I_{u2} = \frac{V_{pri}}{\omega_{sw}L}\left(\beta - \phi - \frac{\pi}{2} + g\frac{\pi-\beta}{2}\right)$$

$$I_{u3} = \frac{V_{pri}}{\omega_{sw}L}\left(\phi - \frac{\pi}{2} + g\frac{\pi-\beta}{2}\right)$$

Figure 6A:
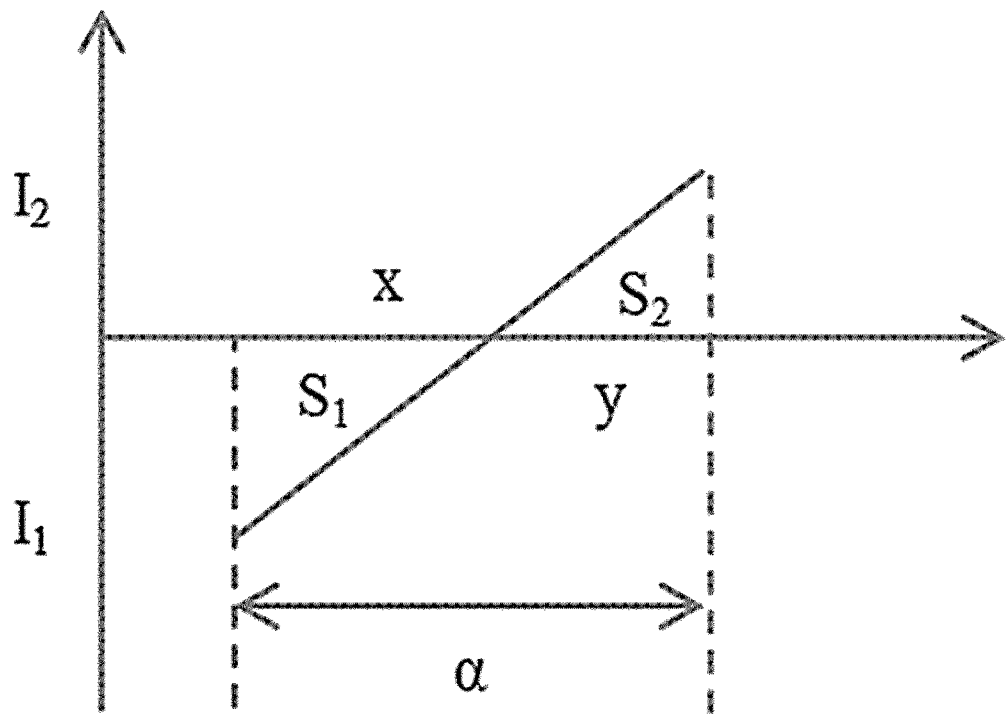
FIGS. 6A and 6B are graphs schematically illustrating a method applied in deriving an average value of the inductor current of the isolated bidirectional DC-DC converter according to the embodiment of the present disclosure.
Figure 6B:
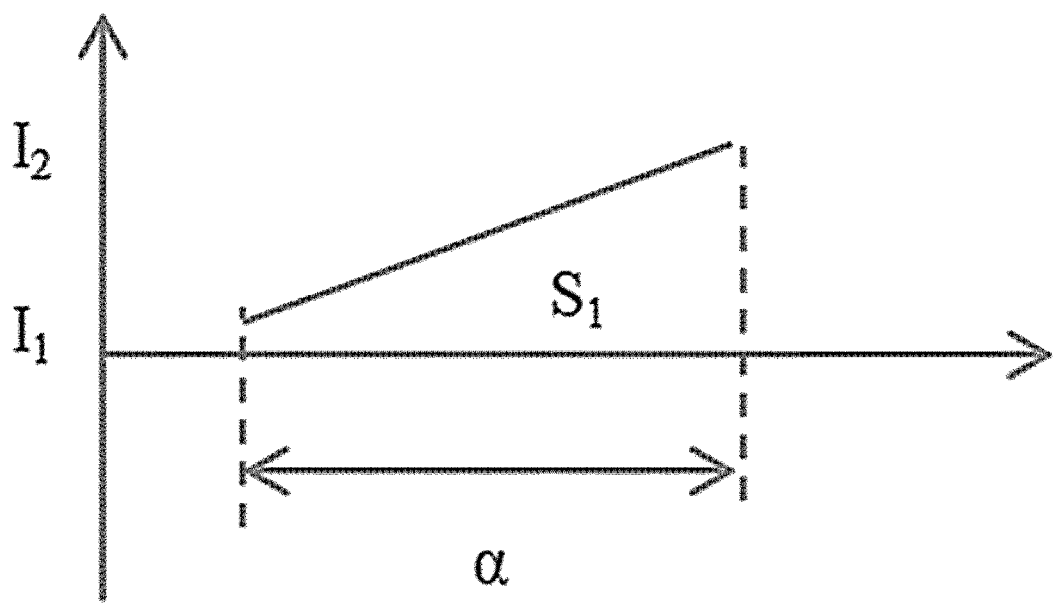

FIGS. 6A and 6B are graphs schematically illustrating a method applied in deriving an average value of the inductor current of the isolated bidirectional DC-DC converter according to the embodiment of the present disclosure.

With reference to examples of FIGS. 6A-6B, in order to obtain the average value of the inductor current, the average value of the half period is obtained to infer the overall average value. The average value in the half period of the current waveform may be displayed in two types of graphs as shown in FIGS. 6A-6B, and the average value may be induced by calculating the area of each graph through integration.

First, in the case of FIG. 6A, the areas of S1 and S2 may be calculated as follows.

$$S_1 = \alpha \times abs(I_1) \times abs(I_1)(2(abs(I_1)-abs(I_2)))$$

$$S_2 = \alpha \times abs(I_2) \times abs(I_2)(2(abs(I_1)-abs(I_2)))$$

Therefore, in this case, the average value $I_{L\_ave}$ of the current becomes S1-S2.

In the case of FIG. 6B, the area of S1 is calculated as follows.

$$S_1 = \alpha \times (I_2 - I_1)/2$$

Accordingly, in this case, the average value $I_{L\_ave}$ of the current becomes S1.

Using the above method, the average value of the four current waveforms of the inductor current iL shown in FIGS. 5A to 5D is derived as shown in the following equation.

As shown in FIG. 5A, in the case of the current waveform when φ≥0 in the step-down condition, the average value $I_{L\_ave}$ of the inductor current iL may be calculated as follows.

$$a_1 = 0.5(I_{d2} + I_{d3})$$

$$a_2 = 0.5(I_{d3} - I_{d1})$$

$$a_3 = 1/(2(|I_{d1}| + |I_{d2}|))(I_{d2}^2 - I_{d1}^2)$$

$$I_{L\_ave} = \frac{1}{\pi}((\pi - \alpha - \phi)a_1 + \alpha a_2 + (\phi)a_3)$$

As shown in FIG. 5B, in the case of the current waveform when φ<0 in the step-down condition, the average value $I_{L\_ave}$ of the inductor current iL may be calculated as follows.

$$a_1 = 1/(2(|I_{d1}| + |I_{d2}|))(I_{d2}^2 - I_{d1}^2)$$

$$a_2 = 1/(2(|I_{d1}| - |I_{d3}|))(I_{d3}^2 - I_{d1}^2)$$

$$a_3 = 1/(2(|I_{d2}| + |I_{d3}|))(I_{d3}^2 - I_{d2}^2)$$

$$I_{L\_ave} = \frac{1}{\pi}((-\phi)a_1 - (\pi - \alpha)a_2 + (\alpha + \phi)a_3)$$

As shown in FIG. 5C, in the case of the current waveform when φ≥β in the step-up condition, the average value $I_{L\_ave}$ of the inductor current iL may be calculated as follows.

$$a_1 = 0.5(I_{u2} + I_{u3})$$

$$a_2 = 0.5(I_{u3} - I_{u1})$$

-continued $$a_3 = 1/(2(|I_{u1}| + |I_{u2}|))(I_{u2}^2 - I_{u1}^2)$$

$$I_{L\_ave} = \frac{1}{\pi}((-\beta + \phi)a_1 + \beta a_2 + (\pi - \phi)a_3)$$

Figure 5D:
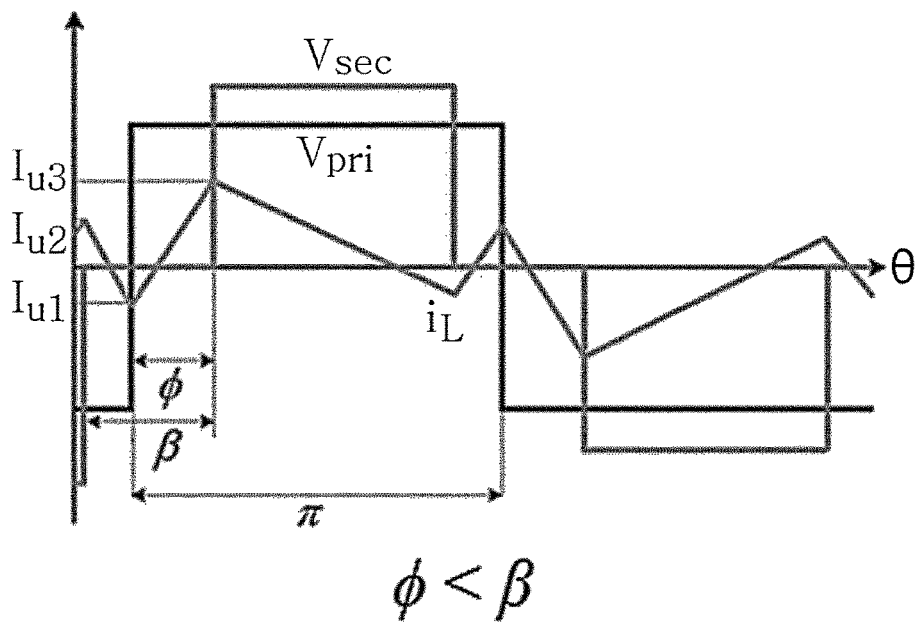

As shown in FIG. 5D, in the case of the current waveform when φ<β in the step-up condition, the average value $I_{L\_ave}$ of the inductor current iL may be calculated as follows.

$$a_1 = 1/(2(|I_{u1}| + |I_{u3}|))(I_{u3}^2 - I_{u1}^2)$$

$$a_2 = 1/(2(|I_{u2}| + |I_{u3}|))(I_{u3}^2 - I_{u2}^2)$$

$$a_3 = 1/(2(|I_{u1}| + |I_{u2}|))(I_{u1}^2 - I_{u2}^2)$$

$$I_{L\_ave} = \frac{1}{\pi}(\phi a_1 + (\pi - \beta)a_2 + (\beta - \phi)a_3)$$

The average value $I_{L\_ave}$ of the inductor current iL according to the step-up condition (φ≥β and φ<β) and the step-down condition (φ≥0 and φ<0) is respectively obtained by the above equations. In the equations, a1, a2, and a3 are symbols used to simplify the arithmetic relationship using the current in the corresponding equations, respectively.

At this time, when the isolated bidirectional DC-DC converter 100 according to the present disclosure is in a normal state, a voltage waveform between the primary side and the secondary side of the transformer 103 appears constantly in a dead time section. The dead time implies the time when the switches 102a to 102d and 104a to 104d of the switching units 102 and 104 are turned off.

However, when the converter 100 is abnormal, for example, when the current is insufficient, a direction of the reflux current in the dead time section is different, so the direction of the voltage is applied in an opposite direction, which may result in loss, thereby creating current waveforms different from the current waveforms shown in FIGS. 5A to 5D.

In this case, the result is different from the modeled result of the inductor current iL derived in the above manner, so it is difficult to accurately predict the inductor current. Accordingly, in the present disclosure, a complementary algorithm configured to reduce a prediction error of the inductor current that occurred in the configuration of FIG. 4 is applied as shown in FIG. 7 to solve such a problem.

Figure 7:
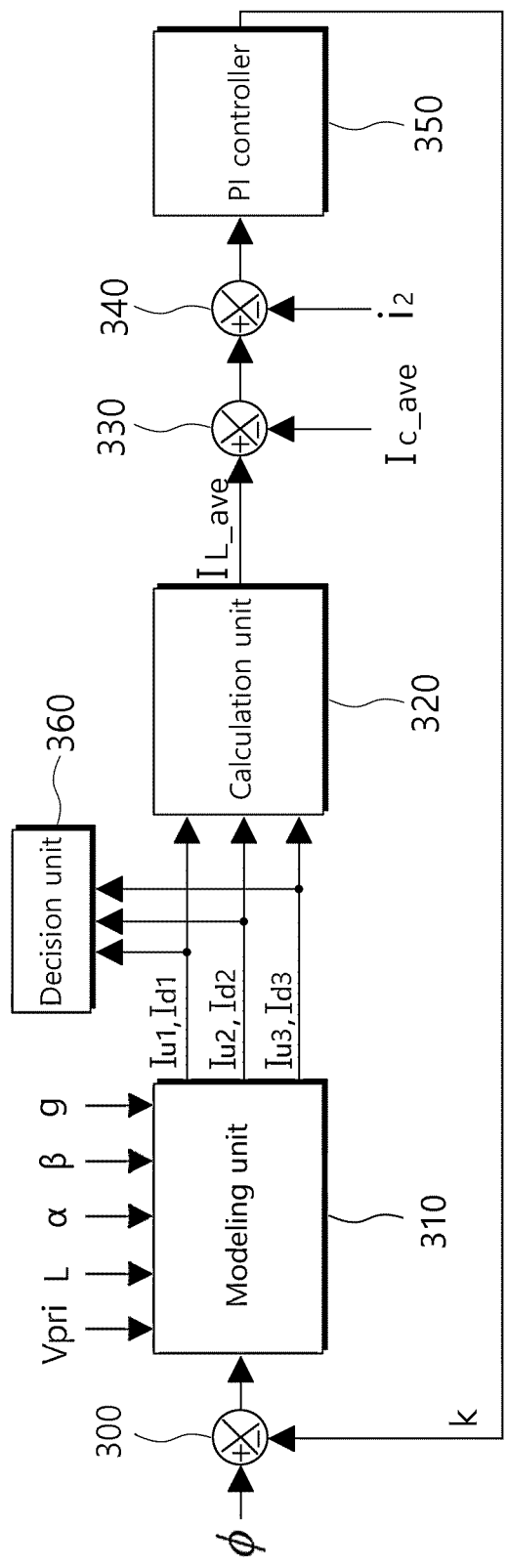
FIG. 7 is a block diagram of an algorithm for reducing a prediction error of the inductor current according to the embodiment of the present disclosure.

FIG. 7 is a block diagram of an algorithm for reducing a prediction error of the inductor current according to the embodiment of the present disclosure.

In the isolated bidirectional DC-DC converter 100 according to the present disclosure, the current iL flowing in the inductor 106 is output by being rectified by a secondary side bridge circuit, that is, a bridge circuit consisting of the secondary side switching unit 104 and the capacitor 105, and the rectified current iLf in this way satisfies the relationship of the following equation.

$$i_{Lf} = i_2 + i_c,$$

wherein, iLf is the rectified current, i2 is the secondary side output current, and ic is the current flowing into the secondary side capacitor 105.

At this time, the rectified current iLf is created by the current iL flowing through the inductor 106, so it may be predicted through the previously derived modeled value of the inductor current.

However, the rectified current iLf changes instantaneously together with the inductor current iL, so there is a drawback in that it is complicated to use as it is. Therefore, to simplify the inductor current iL, the following averaging method derived above is used.

$$I_{L\_ave} = I_2 + I_{c\_ave},$$

wherein $I_{L\_ave}$ is the average value of the inductor current iL, I2 is an average value of the secondary side output current, and $I_{c\_ave}$ is an average value of the current flowing into the second capacitor of the secondary side.

In the present disclosure, $I_{L\_ave}$ may be obtained through modeling according to the present disclosure as described above, and I2 may be obtained by averaging the current i2 detected by the secondary side current sensor 202, but $I_{c\_ave}$ is not able to be directly sensed.

However, in the present embodiment, $I_{c\_ave}$ may be predicted by the relationship between the following currents when the converter 100 is at no load.

$$I_{L\_ave} = I_{c\_ave}(I_2=0)$$

One assumption from the above results is that the average current $I_{c\_ave}$ of the second capacitor required to maintain a constant voltage is constant regardless of the load.

Therefore, when it is assumed that the rectified current calculated at no load is the average current of the second capacitor, all the $I_{L\_ave}$ currents in each condition may be calculated.

Accordingly, in the present disclosure, the output current I2 is basically calculated using the average value $I_{L\_ave}$ of the inductor current calculated through the modeled equation and the average current $I_{c\_ave}$ of the second capacitor measured at no load. In addition, an error between the calculated output current I2 and the actual output current i2 output from the actual converter 100 is calculated, and the error is induced to be zero by using a PI controller.

With reference to FIG. 4, the modeling unit 310 receives a plurality of input values of Vpri, L, $ω_{sw}$, α, β, φ, and g, respectively, as described above and calculates the inflection point current values Id1, Id2, and Id3 of the current waveform in the step-down condition of the converter 100 and the inflection point current values Iu1, Iu2, and Iu3 of the current waveform in the step-up condition of the converter 100.

At this time, in the complementary algorithm, φ is the phase difference between the primary and secondary side voltages of the transformer 103 when the duty ratio according to the on/off switching of the switches 102a to 102d and 104a to 104d is 0.5.

Such a phase difference φ varies according to the zero period length α of the primary side voltage of the transformer 103 and the zero period length β of the secondary side voltage of the transformer 103.

With reference to FIG. 7, input values Vpri, $ω_{sw}$, L, α, β, and g of the modeling unit 310 are fixed constants, and φ is a variable. Accordingly, the modeling unit 310 calculates inflection point current values Id1, Id2, and Id3 during step-down and inflection point current values Iu1, Iu2, and Iu3 during step-up according to the input variable φ.

The calculation unit 320 calculates an average current value $I_{L\_ave}$ at the time of the step-down and step-up by using the inflection point current values calculated by the modeling unit 310.

At this time, φ is a value received from the higher hierarchy controller and is necessary to be controlled so that the error between the output current I2 calculated as described above and the output current i2 actually detected by the converter 100 becomes zero.

In other words, the calculation unit 320 calculates the average current value $I_{L\_ave}$ during step-down and step-up using the inflection point current values Id1, Id2, and Id3 and Iu1, Iu2, and Iu3 of the current waveform during step-down and step-up.

A second comparator 330 calculates the output current I2 by comparing with the average current values $I_{L\_ave}$ and $I_{c\_ave}$ during step-down and step-up according to the averaging method $I_{L\_ave} = I_2 + I_{c\_ave}$.

A third comparator 340 compares the calculated output current I2 with the output current i2 detected by the secondary side current sensor of the actual converter 100 to calculate an error.

A PI controller 350 outputs a gain k for reducing such an error to a first comparator 300. Accordingly, the first comparator 300 adds φ input from the higher hierarchy controller and k received from the PI controller 350, thereby allowing an updated φ to be input to the modeling unit 310. At this time, k is a coefficient for reducing the error between the calculated output current I2 and the actually measured output current i2, and φ in consideration of k is input to the modeling unit 310 and allows the inflection point current values of the current waveform to be recalculated according to the updated φ.

Meanwhile, a determination unit 360 determines whether an overcurrent has occurred from the inflection point current values of the current waveform recalculated and continuously updated in the modeling unit 310. That is, when the inflection point current values are greater than preset reference values, it is determined that the overcurrent has occurred and this is notified to the higher hierarchy controller. When the determination unit 360 predicts the occurrence of the overcurrent, there is a risk of failure, so the higher hierarchy controller may stop the operation of the converter 100.

Figure 8A:
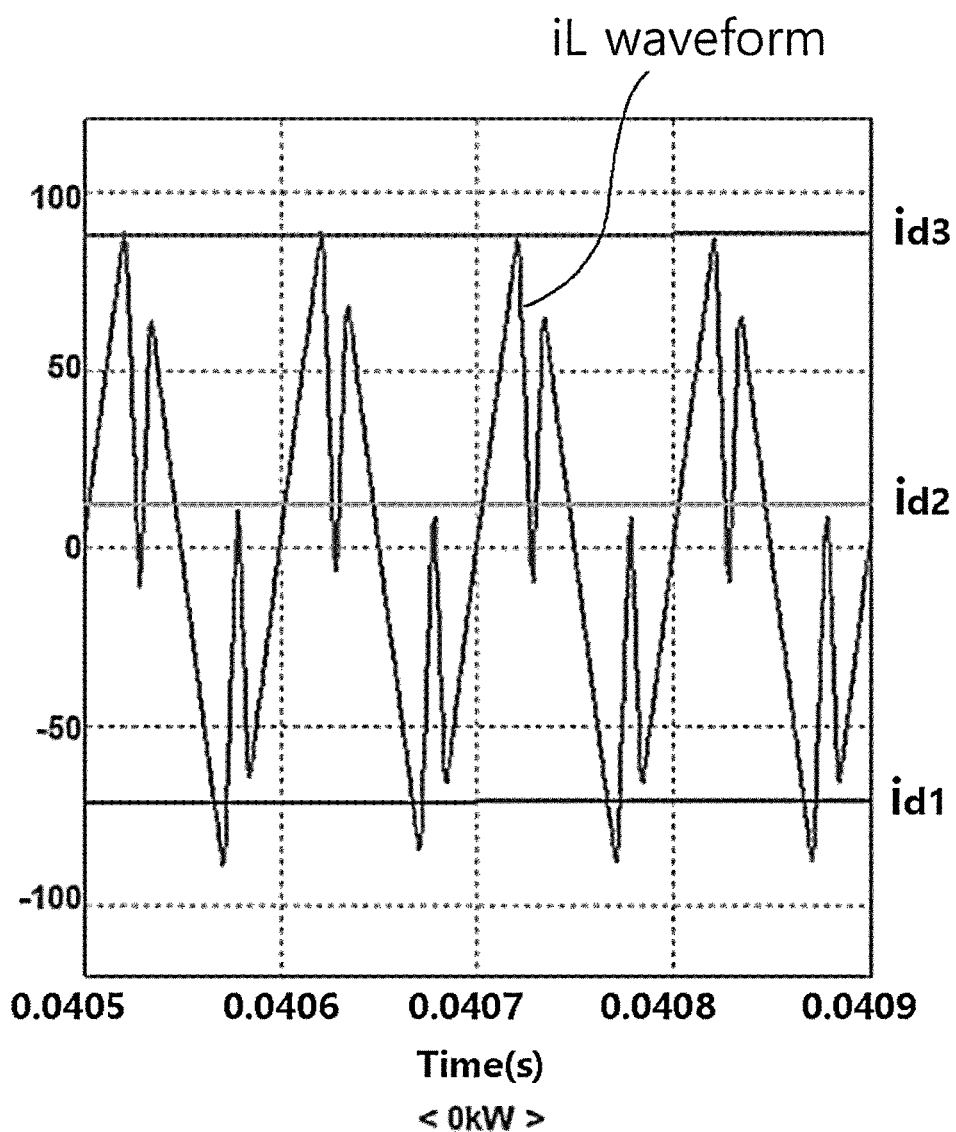
FIGS. 8A and 8B are graphs illustrating results simulated by applying the sensorless prediction method of an overcurrent in the isolated bidirectional DC-DC converter according to the present disclosure in a step-down condition.
Figure 8B:
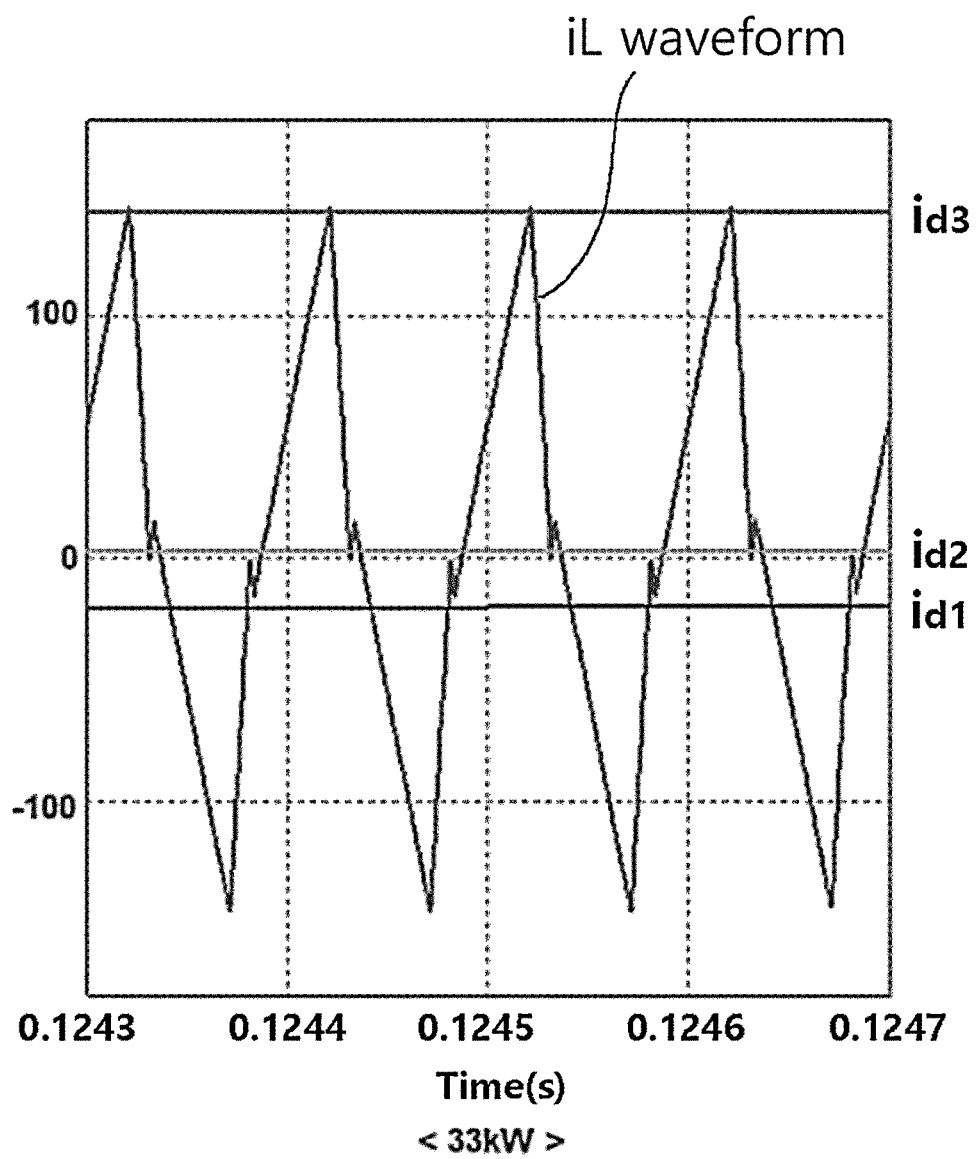

FIGS. 8A and 8B are graphs illustrating results simulated by applying the sensorless prediction method of an overcurrent in the isolated bidirectional DC-DC converter according to the present disclosure in a step-down condition.

In each of FIGS. 8A and 8B, as an example, the inductor current iL is calculated through the overcurrent prediction method of the present disclosure by setting a step-down condition that the input voltage is 750 V and the output voltage is 580 V in the isolated bidirectional DC-DC converter 100, and an example compared the inductor current calculated as such with the peak value through simulation is illustrated.

FIG. 8A is an exemplary graph illustrating a current waveform during step-down at no load in the converter 100, and FIG. 8B is an exemplary graph illustrating a current waveform during step-down at a load of 33 kW in the converter 100.

As may be seen from each of FIGS. 8A and 8B, the waveform of the inductor current iL simulated during step-down in the converter 100 and the peak current id3 of the inflection point inductor current iL calculated through the overcurrent prediction method of the present disclosure are substantially the same.

From such results, when the peak current id3 of the inductor current is greater than a preset threshold, it may be predicted as the overcurrent has occurred. Here, the threshold may be determined according to whether the inductor current may damage the plurality of switches 102a to 102d and 104a to 104d. Accordingly, when the peak current is greater than the threshold that may damage the switch, it may be determined that the overcurrent has occurred. In this case, the higher hierarchy controller may control to take appropriate measures to prevent damage to the switches.

Figure 9A:
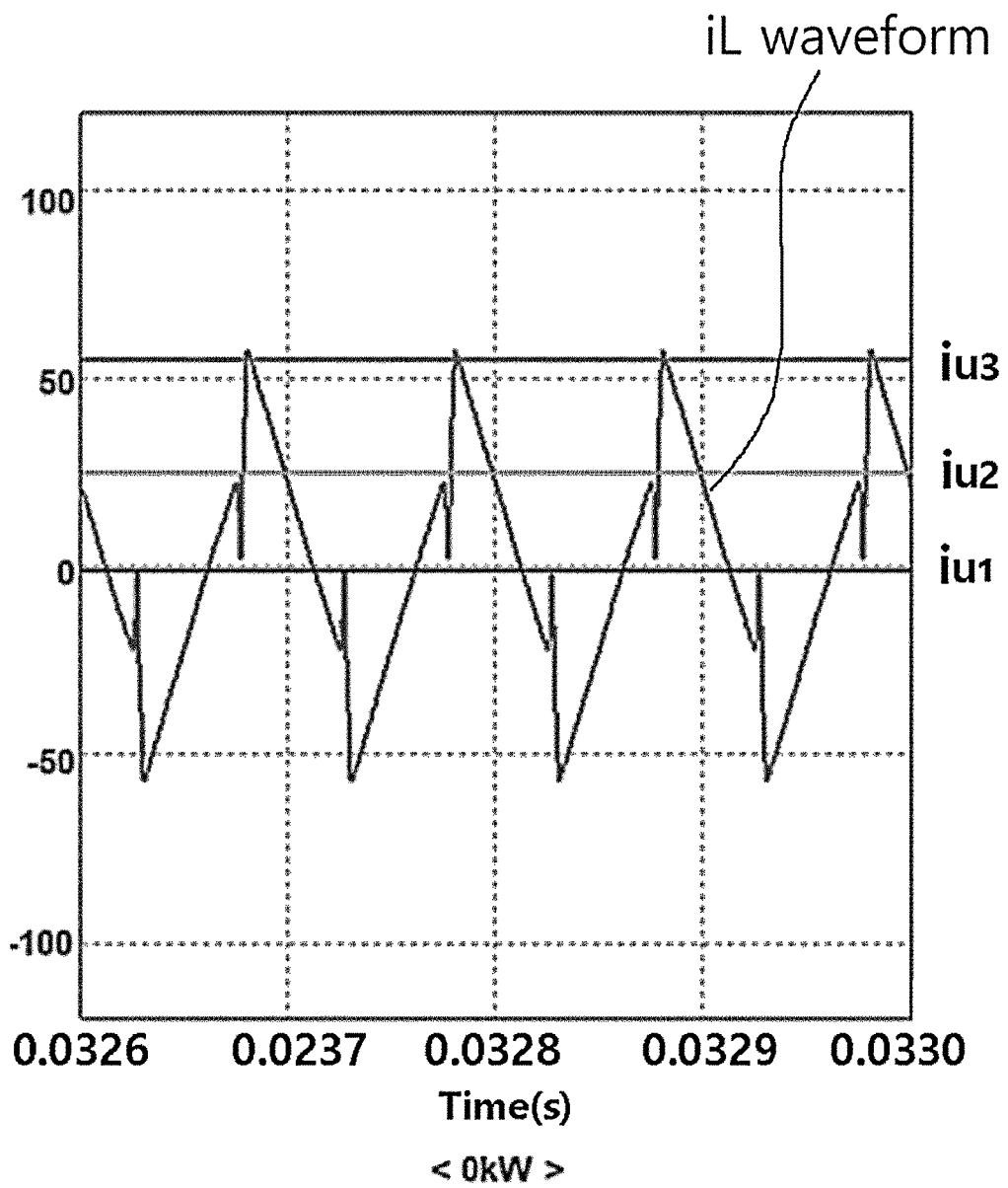
FIGS. 9A and 9B are graphs illustrating results simulated by applying the sensorless prediction method of an overcurrent in the isolated bidirectional DC-DC converter according to the present disclosure in a step-up condition.
Figure 9B:
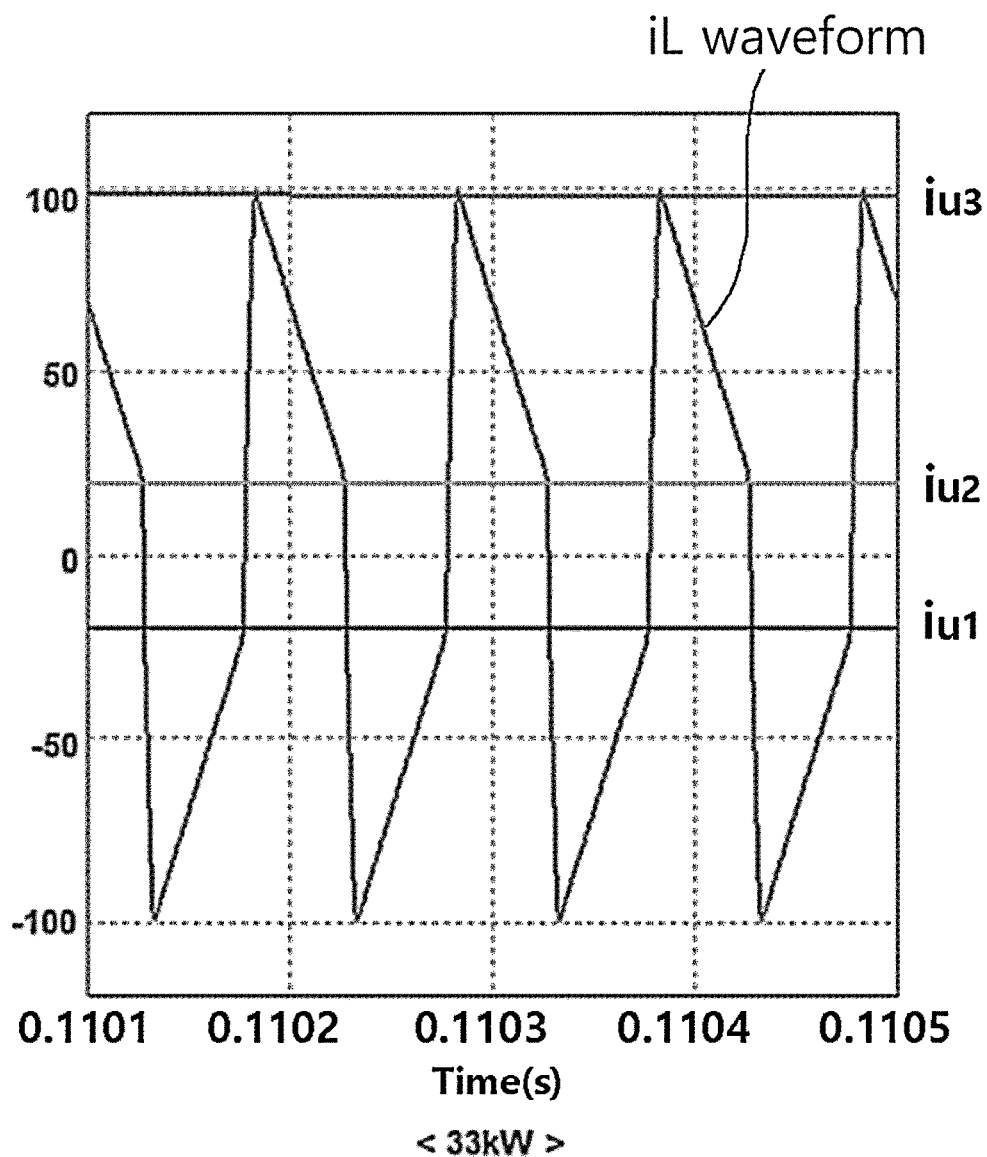

FIGS. 9A and 9B are graphs illustrating results simulated by applying the sensorless prediction method of an overcurrent in the isolated bidirectional DC-DC converter according to the present disclosure in a step-up condition.

In each of FIGS. 9A and 9B, as another example, the inductor current iL is calculated through the overcurrent prediction method of the present disclosure by setting a step-up condition that the input voltage is 750 V and the output voltage is 820 V in the isolated bidirectional DC-DC converter 100, and an example compared by simulation is illustrated.

FIG. 9A is an exemplary graph illustrating a current waveform during step-up at no load in the converter 100, and FIG. 9B is an exemplary graph illustrating a current waveform during step-up at a load of 33 kW in the converter 100.

As may be seen from each of FIGS. 9A and 9B, the waveform of the inductor current iL simulated during step-up in the converter 100 and the peak current iu3 of the inflection point inductor current iL calculated through the overcurrent prediction method of the present disclosure are substantially the same.

From such results, when the peak current iu3 of the inductor current is greater than a preset threshold, it may be predicted as the overcurrent has occurred.

As described above, in the present disclosure, the occurrence of overcurrent may be predicted by predicting the peak value of the inductor current.

In the above, even though it has been described that all the components constituting the embodiment of the present disclosure operate by being combined or combined into one, the present disclosure is not necessarily limited to such an embodiment. That is, within the scope of the objective of the present disclosure, all the components may operate by selectively combining at least one. In addition, terms such as "includes", "composes", "have", or the like described above imply that a corresponding component may be embedded, unless otherwise specified, and thus should be construed as being able to further include other components rather than excluding other components. All terms, including technical or scientific terms, have the same meaning as commonly understood by one of ordinary skill in the art to which the present disclosure belongs, unless otherwise defined. Terms commonly used, such as those defined in the dictionary, should be interpreted as being consistent with the contextual meaning of the related art, and are not interpreted in an ideal or excessively formal meaning unless explicitly defined in the present disclosure.

The above description is merely illustrative of the technical spirit of the present disclosure, and various modifications and variations will be possible without departing from the essential characteristics of the present disclosure by those skilled in the art to which the present disclosure pertains. Therefore, the embodiments disclosed in the present disclosure are not intended to limit the technical spirit of the present disclosure, but to explain, and the scope of the technical spirit of the present disclosure is not limited by these embodiments. The protection scope of the present disclosure should be construed by the following claims, and all technical ideas within the scope equivalent thereto should be construed as being included in the scope of the present disclosure.

The invention claimed is:

1. A sensorless prediction method of an overcurrent in an isolated bidirectional DC-DC converter, the converter comprising a first capacitor configured to charge an input voltage, a first switching unit composed of a plurality of switches and converting and outputting the input voltage charged in the first capacitor through a switching operation, a transformer having a primary side connected to output terminals of the first switching unit, a second switching unit connected to a secondary side of the transformer and composed of a plurality of switches, and a second capacitor configured to store an output voltage of the second switching unit, the method comprising:

- modeling a current waveform for an inductor current of the transformer according to a step-down condition or a step-up condition of the converter using a plurality of input values;
- deriving a current value at inflection points of the modeled current waveform;
- calculating an average value ($I_{L\_ave}$) of the inductor current according to the step-down condition or the step-up condition by using the derived inflection point current values;
- calculating a secondary side output current average value (I2) by comparing a current average value ($I_{c\_ave}$) of the second capacitor when the converter is at no load with the average value ($I_{L\_ave}$) of the inductor current;
- calculating an error between the secondary side output current average value (I2) and a secondary side output current (I2);
- updating the current value at the inflection points of the modeled current waveform by outputting a gain (k) for reducing the error through PI control and using the gain (k); and
- predicting an overcurrent of the inductor current using the updated current value.

2. The method of claim 1, wherein the modeled inductor current increases or decreases linearly, has the average of zero within one period, and is formed such that an element for a first half period x and an element for a second half period x are identical except having opposite signs.

3. The method of claim 1, wherein the plurality of input values comprises a peak value (Vpri) of a primary side voltage of the transformer, each frequency ($\omega_{sw}$) of switching frequencies of the first and second switching units, an internal equivalent inductance (L) of the converter, a zero period length (a) of the primary side voltage of the transformer, a zero period length (β) of a secondary side voltage of the transformer, a phase difference (φ) between the primary and secondary side voltages of the transformer, and a voltage ratio (g) between the primary and secondary side voltages of the transformer.

4. The method of claim 3, wherein, by the following equations,

1) In the case of φ≥0 in a step-down condition $$I_{d1} = \frac{V_{pri}}{\omega_{sw}L}\left(\frac{\alpha-\pi}{2} + g\left(\frac{\pi}{2} - \phi\right)\right)$$

$$I_{d2} = \frac{V_{pri}}{\omega_{sw}L}\left(\frac{\alpha-\pi}{2} + \phi + g\frac{\pi}{2}\right)$$

$$I_{d3} = \frac{V_{pri}}{\omega_{sw}L}\left(\frac{-\alpha+\pi}{2} - g\left(\frac{\pi}{2} - \alpha - \phi\right)\right)$$

2) In the case of φ<0 in the step-down condition $$I_{d1} = \frac{V_{pri}}{\omega_{sw}L}\left(\frac{\alpha-\pi}{2} + g\left(\frac{\pi}{2} + \phi\right)\right)$$

$$I_{d2} = \frac{V_{pri}}{\omega_{sw}L}\left(\frac{\alpha-\pi}{2} + g\frac{\pi}{2}\right)$$

$$I_{d3} = \frac{V_{pri}}{\omega_{sw}L}\left(\frac{-\alpha+\pi}{2} - g\left(\frac{\pi}{2} - \alpha - \phi\right)\right)$$

3) In the case of φ≥β in a step-up condition $$I_{u1} = \frac{V_{pri}}{\omega_{sw}L}\left(\frac{-\pi}{2} + g\left(\frac{\pi+\beta}{2} - \phi\right)\right)$$

$$I_{u2} = \frac{V_{pri}}{\omega_{sw}L}\left(\phi - \beta - \frac{\pi}{2} + \left(\frac{\pi-\beta}{2}\right)g\right)$$

$$I_{u3} = \frac{V_{pri}}{\omega_{sw}L}\left(\phi - \frac{\pi}{2} + g\frac{\pi-\beta}{2}\right)$$

4) In the case of φ<β in the step-up condition $$I_{u1} = \frac{V_{pri}}{\omega_{sw}L}\left(\frac{-\pi}{2} + g\left(\frac{\pi-\beta}{2}\right)\right)$$

$$I_{u2} = \frac{V_{pri}}{\omega_{sw}L}\left(\beta - \phi - \frac{\pi}{2} + g\frac{\pi-\beta}{2}\right)$$

$$I_{u3} = \frac{V_{pri}}{\omega_{sw}L}\left(\phi - \frac{\pi}{2} + g\frac{\pi-\beta}{2}\right)$$

the current values at the inflection points of the modeled current waveform are calculated.

5. The method of claim 4, wherein, by the following equations,

1) In the case of φ≥0 in the step-down condition $$a_1 = 0.5(I_{d2} + I_{d3})$$

$$a_2 = 0.5(I_{d3} - I_{d1})$$

$$a_3 = 1/(2(|I_{d1}| + |I_{d2}|))(I_{d2}^2 - I_{d1}^2)$$

$$I_{L\_ave} = \frac{1}{\pi}((\pi - \alpha - \phi)a_1 + \alpha a_2 + (\phi)a_3)$$

2) In the case of φ≤0 in the step-down condition $$a_1 = 1/(2(|I_{d1}| + |I_{d2}|))(I_{d2}^2 - I_{d1}^2)$$

$$a_2 = 1/(2(|I_{d1}| - |I_{d3}|))(I_{d3}^2 - I_{d1}^2)$$

$$a_3 = 1/(2(|I_{d2}| + |I_{d3}|))(I_{d3}^2 - I_{d2}^2)$$

$$I_{L\_ave} = \frac{1}{\pi}((-\phi)a_1 - (\pi - \alpha)a_2 + (\alpha + \phi)a_3)$$

3) In the case of φ≥β in the step-up condition $$a_1 = 0.5(I_{u2} + I_{u3})$$

$$a_2 = 0.5(I_{u3} - I_{u1})$$

$$a_3 = 1/(2(|I_{u1}| + |I_{u2}|))(I_{u2}^2 - I_{u1}^2)$$

$$I_{L\_ave} = \frac{1}{\pi}((-\beta + \phi)a_1 + \beta a_2 + (\pi - \phi)a_3)$$

4) In the case of φ<β in the step-up condition $$a_1 = 1/(2(|I_{u1}|+|I_{u3}|))(I_{u3}^2 - I_{u1}^2)$$

$$a_2 = 1/(2(|I_{u2}|+|I_{u3}|))(I_{u3}^2 - I_{u2}^2)$$

$$a_3 = 1/(2(|I_{u1}|+|I_{u2}|))(I_{u1}^2 - I_{u2}^2)$$

$$I_{L\_ave} = \frac{1}{\pi}(\phi a_1 + (\pi - \beta)a_2 + (\beta - \phi)a_3)$$

the average value ($I_{L\_ave}$) of the inductor current is calculated.

6. The method of claim 3, wherein the o is a phase difference between the primary and secondary side voltages of the transformer when a duty ratio according to on/off switching of the first and second switching units is 0.5, and
the updating the current value at each of the inflection points of the modeled current waveform recalculates the inflection point current values of the modeled current waveform using φ updated by summing the output gain (k) and the input variable q.

7. The method of claim 6, wherein, when the updated inflection point current value is greater than a preset reference value, the predicting an overcurrent predicts the overcurrent has occurred.

8. The method of claim 3, wherein, in the step-down condition, the current waveform is characterized that, in the case of φ≥0, the Vpri has a phase faster than the Vsec by the φ, and the Vsec is smaller than the Vpri, and in the case of φ<0, the Vpri has the phase delayed more than the Vsec by the φ, and the Vsec is smaller than the Vpri.

9. The method of claim 3, wherein, in the step-up condition, in the case of φ≥β>0, the Vpri has a phase faster than the Vsec by the φ, and the Vsec is greater than the Vpri, and in the case of φ<β, the Vpri has the phase faster than the Vsec by the φ, and the Vsec is greater than Vpri.

* * * * *